United States Patent [19]
Sander

[11] Patent Number: 5,972,254
[45] Date of Patent: Oct. 26, 1999

[54] ULTRA-THIN PRESTRESSED FIBER REINFORCED AEROGEL HONEYCOMB CATALYST MONOLITHS

[76] Inventor: Matthew T. Sander, 10361 Stablehand Dr., Cincinnati, Ohio 45242

[21] Appl. No.: 08/761,649

[22] Filed: Dec. 6, 1996

[51] Int. Cl.$^6$ ..................................................... B28B 7/04
[52] U.S. Cl. ............................ 264/39; 264/621; 264/229
[58] Field of Search ............................ 264/39, 621, 229; 501/95.2

[56] References Cited

U.S. PATENT DOCUMENTS

| | | | |
|---|---|---|---|
| 5,207,814 | 5/1993 | Cogliati | 65/18.3 |
| 5,242,647 | 9/1993 | Poco | 264/225 |
| 5,306,555 | 4/1994 | Ramamurthi | 428/289 |
| 5,395,805 | 3/1995 | Droege | 501/72 |
| 5,538,931 | 7/1996 | Heinrichs | 502/234 |

FOREIGN PATENT DOCUMENTS 0186149  12/1985  European Pat. Off. .

OTHER PUBLICATIONS

Ind. Eng. Chem. Res. 1993 32 826–834 Svachula.
Catal Rev Sci Eng 37(1) 145–178 1995 Nojiri.

*Primary Examiner*—Christopher A. Fiorilla

[57] ABSTRACT

A method for reinforcing thin panels or monoliths of aerogels, xergels, zeolites and other low density material with prestressed fibers in two of three dimensions (30, 32, 34). The utilization of internal molding and gas flow through channels (10) within the Aerogel monolith to achieve catalytic selectivity of the desired gas phase heterogeneous reaction. A method of internal molding (52) and decreased supercritical fluid drying times (72) for Aerogels by means of using gas porous molding features (60) that are compatable with the prestressed fiber reinforcing system (42).

5 Claims, 7 Drawing Sheets

ULTRA-THIN PRESTRESSED FIBER REINFORCED AEROGEL HONEYCOMB CATALYST MONOLITHS

BACKGROUND-FIELD OF INVENTION

This invention relates to monolithic aerogel catalysts and composite materials, specifically to the manufacture of pre-stressed ultra-thin fiber reinforced aerogel honeycomb catalyst monoliths.

BACKGROUND-DESCRIPTION OF PRIOR ART

Aerogel catalysts are generally used in the form of fine powders or lumps which are fragile, loose, and difficult to handle in chemical reactors. Severe pressure drops and heat and mass transfer limitations occur in fixed bed reactors where aerogels are used in these types of physical forms. Other alternative forms such as aerogel coatings on Rashig rings or aerogels being embedded into alundum boiling stones have been tried with limited success to assist in improving on the above limitations. Fluidized bed reactors have also been piloted using the "lumps" form of aerogels with limited success.

European Patent Number #0186149 by Stauffer Chemical Company describes the preparation of non-aged, inorganic oxide containing aerogels. The method comprises the steps of dissolving the alkoxide in a solvent, optionally adding a catalytic amount of a base or acid, and hydrolyzing the metal compound to produce a gel. The solvent in the gel is exchanged with an extraction fluid, and the fluid in the gel is supercritically extracted to form an aerogel. The patent describes the preparation of amorphous, granular metal oxide aerogels, rather than monolithic forms.

Transparent metal oxide aerogel monoliths have been successfully formed by Lawrence Livermore National Laboratory, U.S. Pat. No. 5,395,805 to Droege (1995), in samples approximately 1 inch in diameter and 0.25 inches thick. This type of small monolith has extremely limited commercial catalytic applications due to its essentially inaccessible internal surface area. The pressure drop that is required to access the internal surface area is tremendously high. Per the LLNL patent, the fabrication of these small monoliths requires a containment vessel that is sealed in such a way as to be gas permeable.

Conventional honeycomb monolith chemical reaction beds for $NO_x$ reduction are typically at least 20 feet in depth (a 20 foot superficial gas flow path) and have the disadvantages of relatively high pressure drop, laminar flow in the honeycomb channels, and active catalyst surface limited to the surface washcoating of the catalyst impregnated on a ceramic honeycomb monolith.

Current catalyst pore structures depend on the micropore and macropore structure of the material of the base monolith and the ability to uniformly apply a washcoat of material over the monolith. Washcoat connections with the support via thin branches in small pores are highly vulnerable to thermal stress cracking. Typical internal surface areas for a titania monolith are approximately 50 $M^2$ per gram of material. The washcoat layer surface area is normally in the range of 100 to 200 $M^2$ per gram of material. Once a thin washcoat has been poisoned by materials such as alkalies and sulfur oxides, the catalyst will be deactivated.

A conventional composition for a $NO_x$ reduction catalyst that utilizes ammonia for its reduction agent is in the range of four to eight weight percent vanadium oxide or tungsten oxide coated over a titania monolith. The current commercial catalysts have a formulation tradeoff limitation between more vanadium which increases the activity toward $NO_x$ reduction but also increases the activity of the unwanted oxidation reaction of $SO_2$ to $SO_3$. $SO_3$ combines with the ammonia to form ammonium bi-sulfate or ammonium sulfate which can cause corrosion and plugging of the downstream heat exchange equipment. The vanadium oxide allows activity toward $NO_x$ in lower operating temperature zones than the tungsten oxide.

Aerogel matrix composites using fibers dispersed within the bulk aerogel have been successfully formed by Battelle Memorial Institute U.S. Pat. No. 5,306,555 to Ramamkurthl (1994). These samples were formed with a high weight percentage of fibers, from 9 to 35, and had relatively low surface areas from 147 to 303 $M^2$ per gram of material.

Although these related patents discuss the formulation of metal oxide aerogels and methods of fabrication of small aerogel monoliths over long time periods (days), none address the practical application of aerogels as catalysts. Economic fabrication techniques for aerogel catalyst sections where the inherently large internal surface area characteristics can be fully exploited at low pressure drops in gas reacting systems are not addressed. The present invention addresses the need for a method that allows economic production of large ultra-thin honeycomb aerogel catalyst sections that allow the unique surface area of aerogels to be fully exploited at very low gas pressure drops.

OBJECTS AND ADVANTAGES

The following lists several objects and advantages of the invention:

(a) The ultra-thin aerogel honeycomb monolith has flow through gas channels that will allow the chemical reactants to access the entire internal surface area of the aerogel catalyst with minimal pressure drop.

(b) Space velocities are nearly an order of magnitude greater than conventional catalysts, this allows for extremely thin catalyst sections to be effectively utilized.

(c) The ultra-thin catalyst crossection will allow a much greater effective mass transfer coefficient.

(d) The combination of advantages (c) and (d) will allow the reactor catalyst section to be more highly selective toward the reduction of $NO_x$ versus the unwanted side reaction of oxidation of $SO_2$ to $SO_3$.

(e) The aerogel catalyst will have much greater life than conventional washcoated catalyst due to its homogeneous nature, and the entire monolith surface being chemically reactive.

(f) The inclusion of pre-tensioned reinforcing fibers in the aerogel honeycomb monolith will allow the ultra-thin catalyst sections to resist the pressure drop of the gas flows. Pre-stressing offers enhance shear resistance, higher fatigue strength, and greatly reduced cracking under service loads.

(g) The pre-tensioning approach allows an order of magnitude less fibers to be used when compared to conventional aerogel composite approaches. This results in retaining rather than degrading the extremely high surface areas of the aerogels.

(h) The aerogel mold design will allow the mold to serve multiple uses: as the frame for the pre-tensioned reinforcing fibers, as the gas porous mold during the polymerization (gelation) process, and as the gas porous mold during the supercritical drying process.

(i) Allowing the gas porous mold to serve as both the polymerization and drying vessel enables the matrix of reinforcing fibers and the aerogel inorganic matrix to achieve its maximum composite strength.

(j) The gas porous mold and its gas porous fingers which penetrate through the monolith, are the internal molds for the gas channels and will allow extremely rapid super-critical drying in minutes rather than hours or days.

(k) The ceramic tensioning caps that are the integral part of the pre-stressing system for reinforcing fibers used in the aerogel catalyst, also serve as a permanent, extremely tough handling surface for the large ultra-thin catalyst sections.

(l) Zirconium was added to the transition metal oxides mix of vanadium and tungsten to create site dislocations in the crystalline structure of the catalytic surface and thereby increase reactive surface area.

| Reference Numbers in Drawings | |
| --- | --- |
| 10 flow through gas channel | 30 no Z axis reinforcement fibers |
| 12 Y axis direction reinforcing fiber | 32 Y axis reinforcement fibers |
| 14 X axis direction reinforcing fiber | 34 x axis reinforcement fibers |
| 20 mold shape alternative | 40 mold side |
| 22 hollow flow 'finger' | 42 tensioning cap |
| 24 mold shape alternative | 44 reinforcement fiber |
| 26 mold shape alternative | 50 Aerogel matrix |
| 60 mold fingers | 52 tapered, porous, hollow 'finger' |
| 62 mold side plate | 74 extraction vessel side |
| 64 machined gas holes in mold plate | 70 gas flow through area of vessel |
| | 72 molds in vessel |

DESCRIPTION OF INVENTION

These innovations described in this patent application were first disclosed in Disclosure Documents 372026 and 373560 with recorded filing dates of Mar. 3, 1995 and Apr. 3, 1995 respectively.

Figure 1:
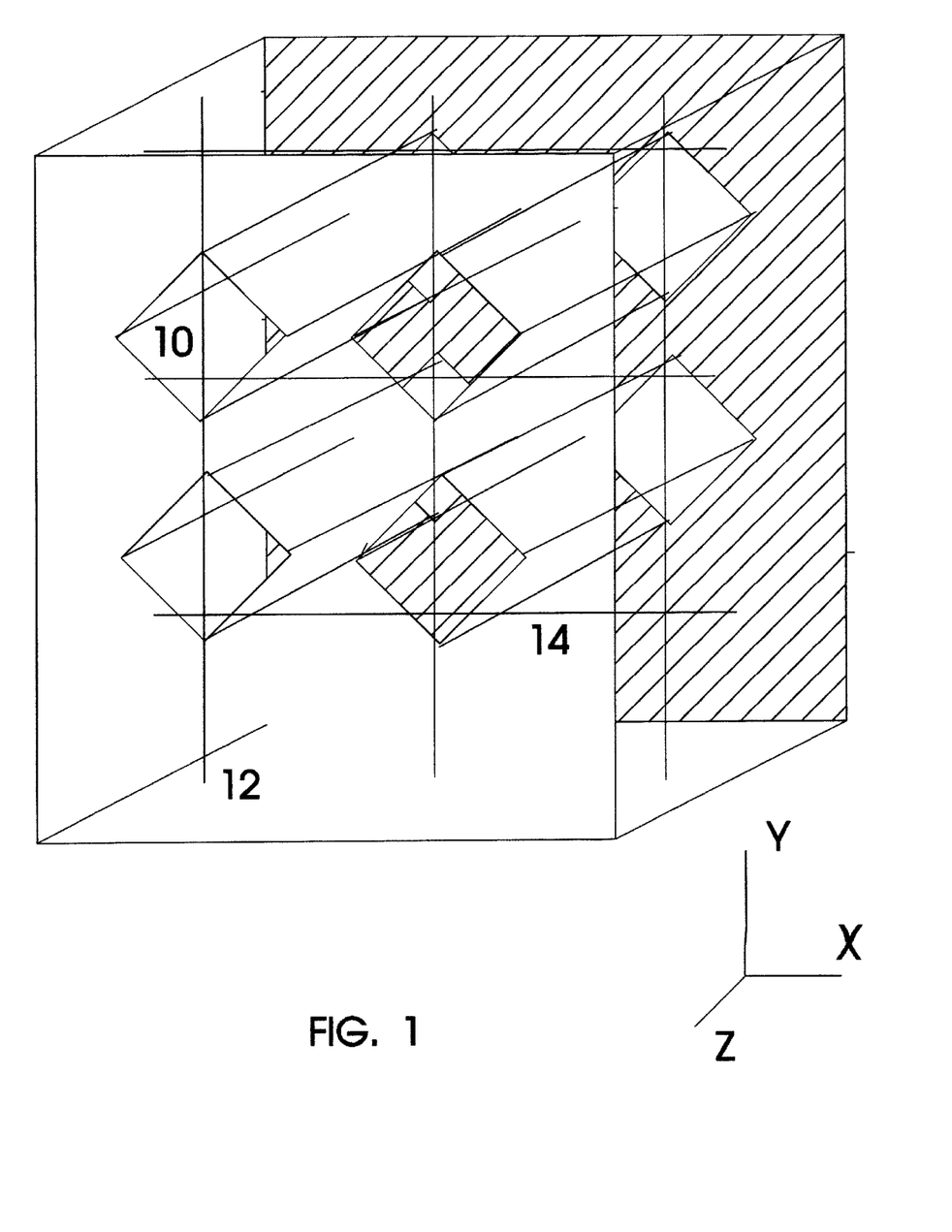
FIG. 1 shows an ultra thin fiber reinforced aerogel honeycomb monolith section with flow through gas channels.

The Composite aerogel matrix honeycomb monolith is comprised primarily of the titanate anatase that is polymerized from the metal alkoxides involved in the transition metal mixed oxide aerogel process and some type of reinforcing fiber that will be compatible with highly oxidizing high temperature environments. The ultra-thin honeycomb monolith has flow through gas channels 10 as illustrated by FIG. 1 that will allow the chemically reacting species to fully access and take complete advantage of the surface within the aerogel at a minimum pressure drop. Typical surface areas for these monolith aerogels are 400 to 1000 $M^2$ per gram of material. Because the aerogel is comprised of a homogeneous mixture of mixed transition metal oxide materials, all the internal surface area throughout the honeycomb matrix is a catalytic site. It approaches being the ultimate in a catalytic material, since all the surface area, both external and internal is reactive. The ultra-thin catalyst bed and its extremely low pressure drop has tremendous operating cost advantages for all low pressure, high gas flow reaction systems such as the selective catalytic reduction of $NO_x$ and complete oxidation of carbon monoxide and hydrocarbons.

Being able to practically access the extremely high reactive surface area of the aerogel and the ability to fabricate a homogeneous reacting monolith will allow a number of innovative advances. Space velocities that are in the range of an order of magnitude greater than conventional $NO_x$ reduction catalyst can be achieved. This allows extremely thin sections of catalyst monolith to be utilized (for example eight centimeters thick by one meter square). The thin cross-section of catalyst will allow a much greater effective mass transfer coefficient per unit of pressure drop. This is accomplished by greatly reducing the depth of the boundary layer of the reacting gas on the exposed catalyst surface area as a result of entrance effects of the honeycomb monolith channel, even though the flow velocities and resultant pressure drops are characteristic of the low pressure drop laminar flow region. The entrance flow effects for a Reynolds number of 2000 and flow channel with 0.5 cm characteristic width would take approximately 35 cm to build to a fullly developed parabolic flow profile. Thus, by keeping the gas flow path length of the monolith approximately 5 times shorter than the fully developed laminar flow characteristic length, the mass transfer of the reactants through the boundary layer to the active site on the catalyst surface can be maximized. Literature references indicate that this phenomena can double the effective mass transfer coefficient when compared to the fully developed laminar flow that occurs throughout the majority of a conventional $NO_x$ selective reduction reaction catalyst bed.

The combination of the increase in effective mass transfer and the order of magnitude space velocity increase will greatly reduce the amount of $SO_2$ that is oxidized to $SO_3$ per unit of $NO_x$ reduced. This is due to the fact that the reduction of $NO_x$ is mass transfer controlled while the oxidation of $SO_2$ is kinetically controlled. Depending on the temperature of the reaction zone that is chosen, the amount of vanadium oxide and tungsten oxide that will be permitted in the catalyst will be greatly increased when compared to conventional catalyst systems, thereby allowing greater activity toward the reduction of $NO_x$ per unit of catalyst. These innovations allow this reaction system to selectively reduce $NO_x$ under fundamentally more favorable process conditions.

The homogeneous extremely high surface metal oxide catalyst matrix that is characteristic of an aerogel will also allow for much greater catalyst life than conventional washcoated catalytic material. The thermal stresses that will destroy conventional washcoated material and its bond to the supporting substrate are not present in material that is formed in a homogeneous fashion at the micropore level. The complete matrix of the material is also reactive, rather than just a thin washcoat layer. Thus the catalyst poisons are required to diffuse deep into the micropores of the aerogel structure to deactivate the catalyst. This contrasts with the thin catalytic washcoat where the poisons can readily access the majority of the catalytic surface area.

Figure 3:
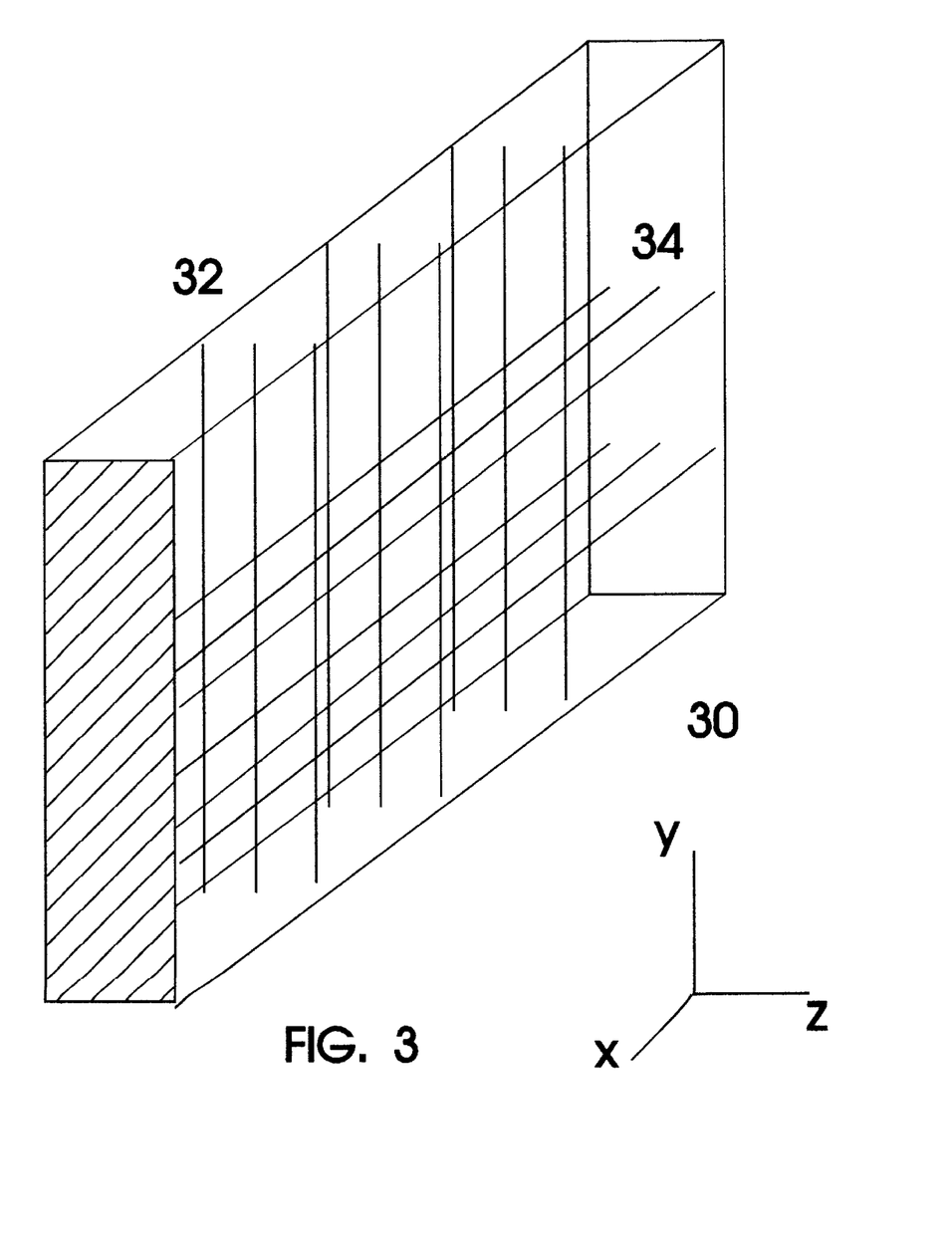
FIG. 3 shows the pre-stressed fiber reinforcement of an aerogel monolith.

The ability to fabricate a relatively brittle metal oxide aerogel into thin honeycomb monolith sections and give it the capability to resist gas flows and thermal cycles is the key to the breakthroughs described above. The compressive strength of the acid catalyzed aerogel material is satisfactory, but the titanate aerogel material is especially brittle and not capable of withstanding any bending moments that would be induced by gas flow through the catalyst monolith in the 8 centimeter thick dimension. A good analogy to this situation is reinforced concrete, which has good compressive strength, but low tensile strength and therefore cannot withstand bending moments without metal bar reinforcement so that the concrete and metal together can act as a composite material. The aerogel matrix is reinforced with pre-tensioned fibers of compatible material running in the x 14, 34 and y axis 12, 32 directions as shown in FIGS. 1 and 3. No fibers are run the z 30 axis direction, since the catalyst monolith only has to resist bending moments and the resulting tensile stress from gas flowing in the z direction. The same reinforcing principles could be used to fabricate extremely strong large thin aerogel insulating panels, skylights, and windows.

The pre-tensioned fibers within the aerogel matrix take full advantage of the high compressive strength of the aerogel by pre-stressing the catalyst monolith to eliminate the tensile loading stress that occurs from the gas flow pressure drop. The elimination of the stresses also greatly reduce the propensity of the catalyst monolith to cracking. Pre-stressing has several advantages over conventional composite approaches, they are enhanced shear resistance, higher fatigue strength, and improved performance by greatly reduced cracking under the intended service load (gas flow pressure drop across the honeycomb monolith). The slenderness ratio (thickness versus length) of this pre-stressed composite honeycomb monolith is 12 which represents the most conservative of designs. The upper limits of slenderness ratios can approach 27 according to literature sources.

The reinforcing fiber material should have near to the same thermal coefficient of expansion as the base aerogel material, in this case titanate anatase. Highly directional, chemically stable, glass fibers are the best reinforcing material for metal oxide aerogel catalysts and their intended applications. Silicon carbide could also be a candidate, if the partial pressure of carbon monoxide can be kept within the desired limits. Metals such as titanium and stainless steels would appear to have too high a thermal coefficient of expansion to be useful for this application, since thermal shock and brittle failure fatigue due to crack propagation would be a potential problem.

The pre-stressing approach also allows an order of magnitude less fibers to be utilized than previous approaches. Battelle Laboratories has U.S. Pat. No. 5,306,555 to Ramamurthl (1994) for whisker reinforcement of aerogels. The random whisker fiber reinforcement will not provide the directional strength necessary to resist the anticipated bending moments of these relatively thin large surface area catalyst blocks that are necessary for the intended application. The pre-tensioned fibers in this invention however, are specifically designed to resist the bending moment created by the pressure drop or drag of the gas flowing through the gas channels of the monolith. The random whiskers would also appear to create problems with the monolith gas flow paths. It is unclear whether the could be evenly dispersed in a monolith arrangement. The pre-tensioned fibers will run through the monolith between the gas channels and thus have no interference problems. Battelle laboratories achieved its highest strength aerogels as they approached 35 Wt % fibers, in this case the material functions nearly as a conventional polymeric composite material. The pre-stressing approach allows for a order of magnitude less fibers to be used in the composite material, yet results in better tensile strength results than conventional techniques.

In this case the aerogel matrix closely resembles a pre-stressed concrete or masonry structure, with the fibers or tensioning elements being a very small percentage of the total weight of the structure. This allows the aerogel honeycomb monolith to still achieve its extremely high surface areas while retaining its high tensile strength.

Figure 2:
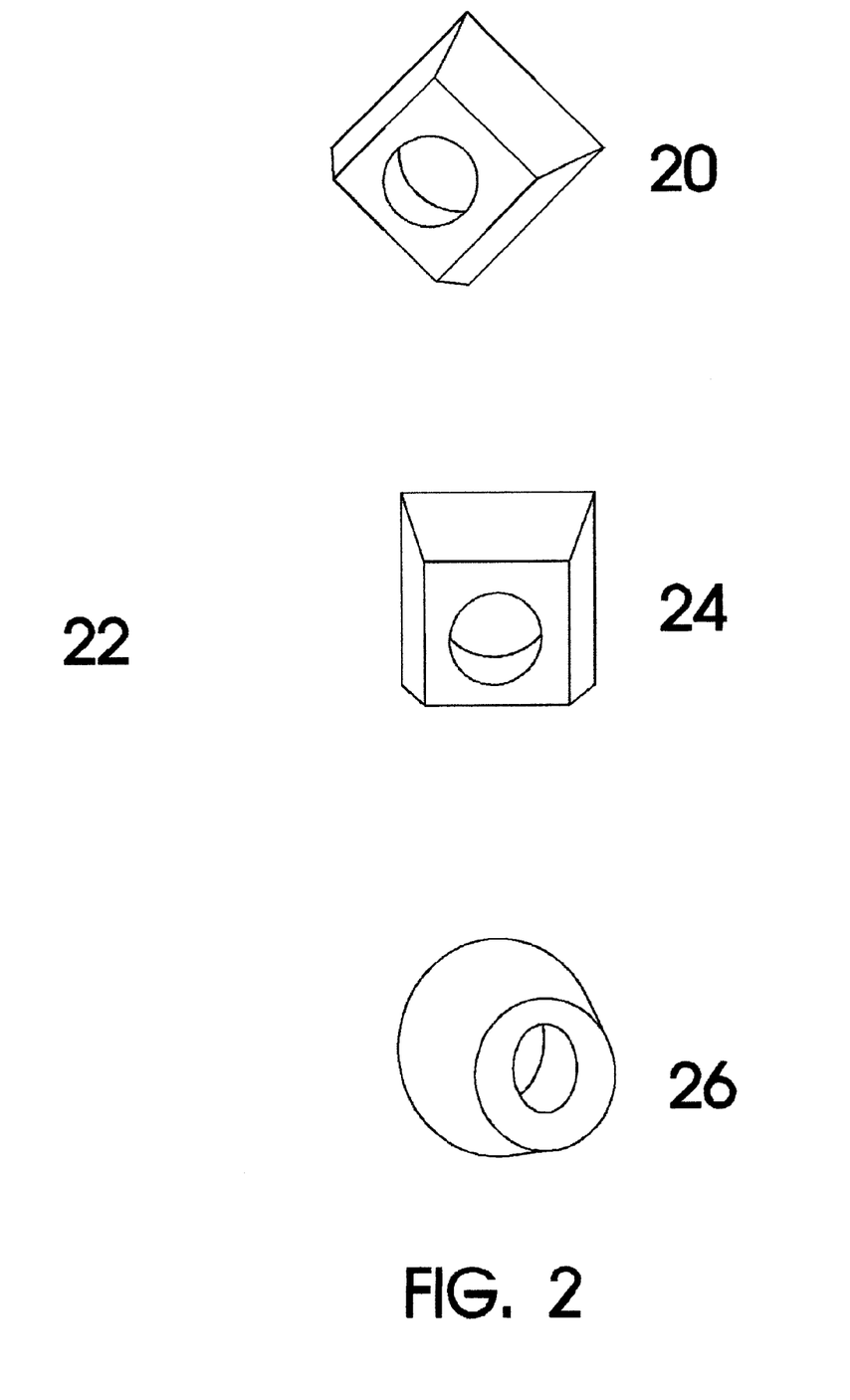
FIG. 2 shows alternative shapes for aerogel mold "fingers".

Extrusion of the material would not appear practical due to the fact that this material polymerizes in a similar fashion to a thermoset resin, from a metal alkoxide to the titanate anatase form. The gas flow paths running in the z axis are also perpendicular to the necessary fiber reinforcement in the x and y axis as illustrated in FIG. 1, so the gas flow paths could not be extruded with the fiber reinforcement. Therefore the catalyst is formed in gas permeable molds with pre-tensioned fiber reinforcement in the x and y axis. The appropriate metal alkoxides will be thoroughly mixed, and water and the acid catalyst will be introduced before the mixture is poured into the mold. The molds have gas permeable "flow path fingers" in the z axis direction that will mold the gas flowpaths in the monolith. Typical shapes 20, 24, 26 for these hollow 22 flow fingers are shown in FIG. 2.

Figure 4:
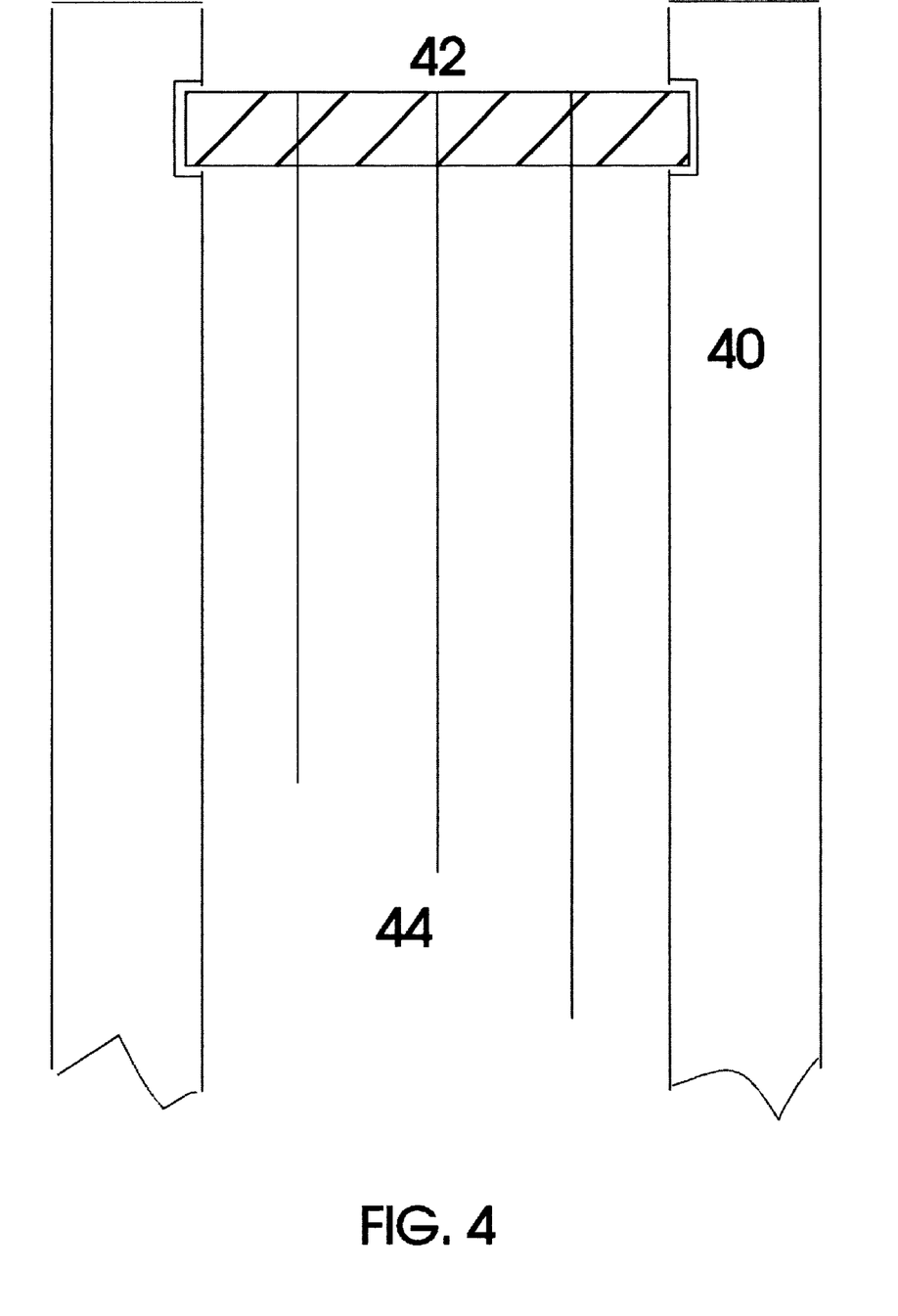
FIG. 4 shows an aerogel mold section showing ceramic tensioning cap and prestressed reinforcing fibers.
Figure 5:
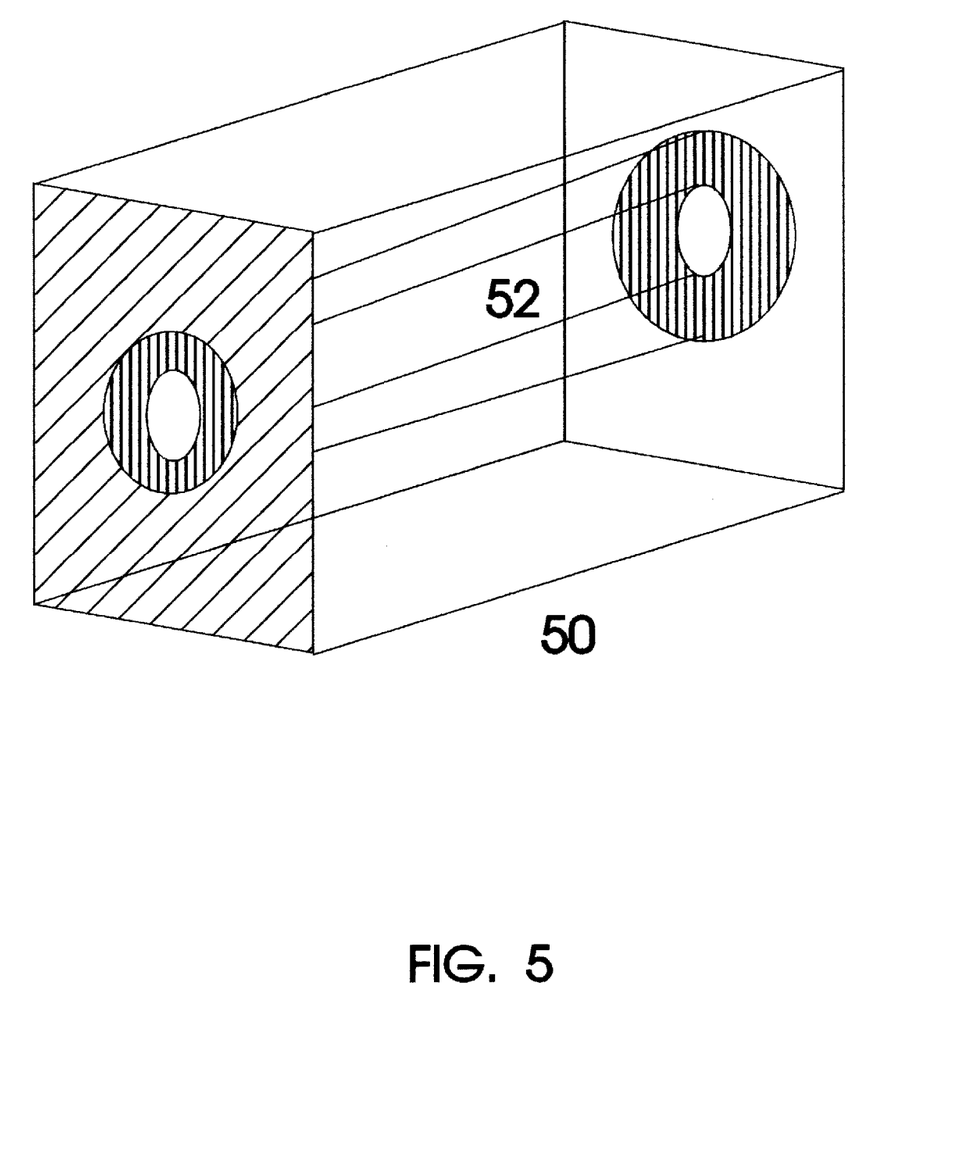
FIG. 5 shows section detail of the tapered, porous, hollow mold "fingers" surrounded by the aerogel matrix.
Figure 6:
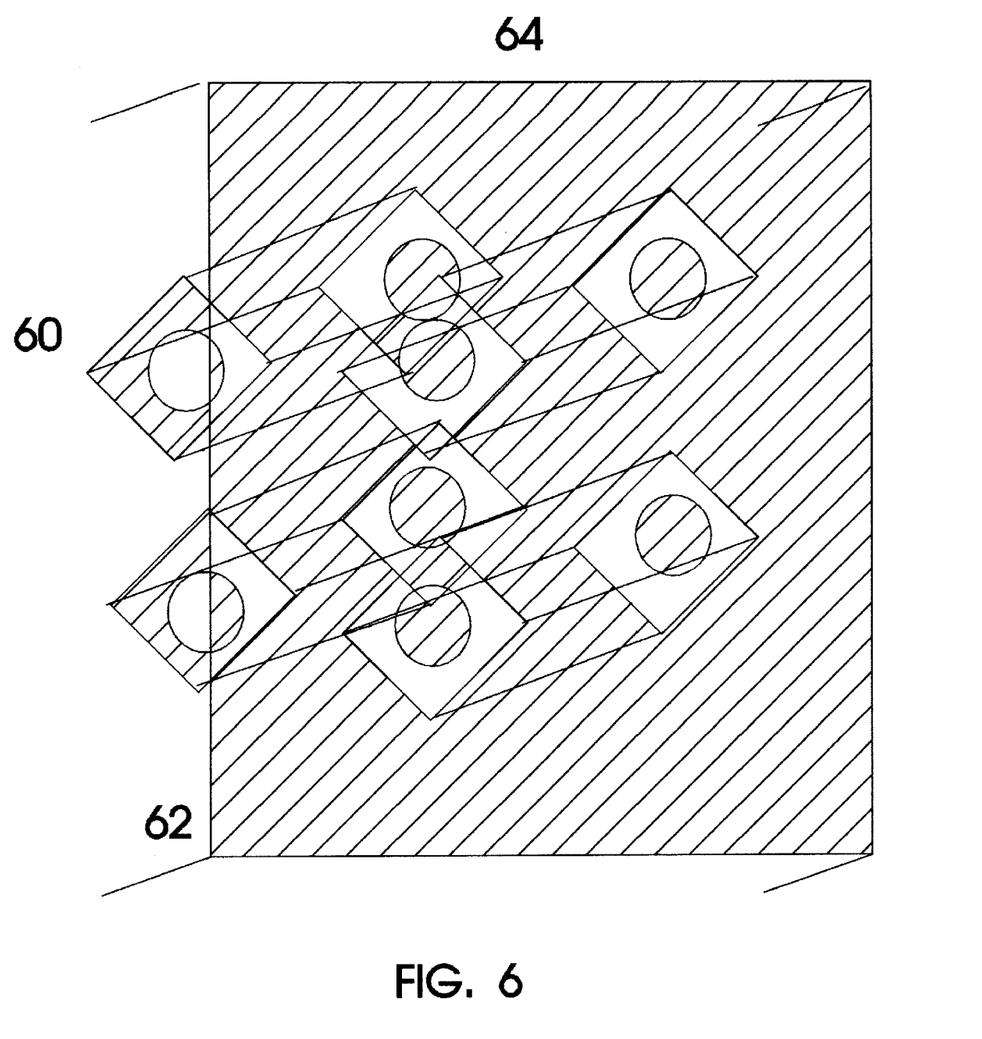
FIG. 6 shows a detailed section of the mold fingers projecting from one side of the aerogel mold.
Figure 7:
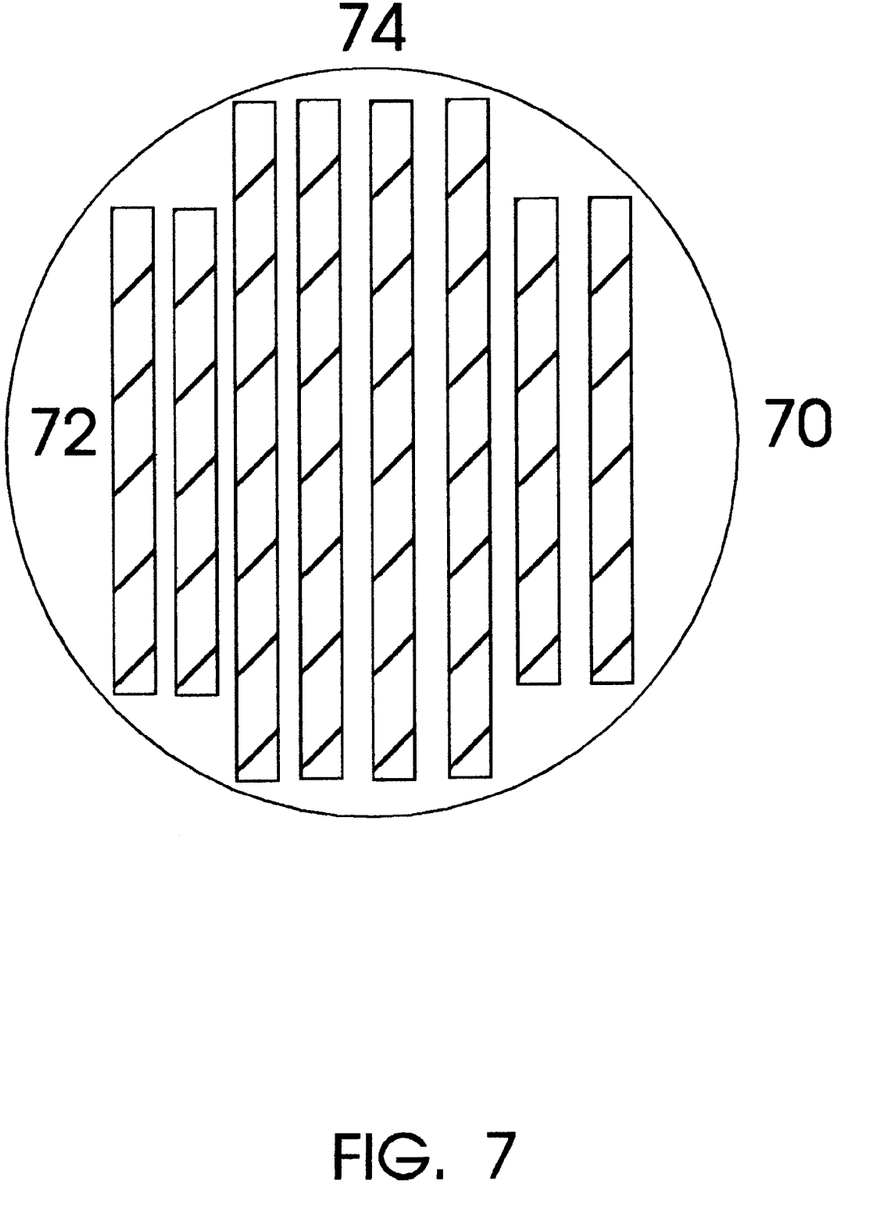
FIG. 7 shows a detail of the molds mounted in the extraction vessel to permit gas to flow past the molds.

The unique design of the aerogel mold will allow the mold to serve multiple uses as the container during the polymerization process, a frame for the pre-tensioned reinforcing fibers 44, and a mold during the supercritical drying process. The stainless steel mold plates 40 contain edge slots that hold the ceramic tensioning caps 42 for the honeycomb monolith's outside edges that contain reinforcing fiber thread holes that are rounded to allow pre-tensioned fibers to be strung through in a grid-like pattern similar to a tennis racquet. A typical cross section is shown in FIG. 4. The one meter square sides of the mold have gas flow holes 64 and larger honeycomb mold support holes machined into the surface of the metal mold plates 62 as shown in FIG. 6. Gas porous, hollow, tapered mold "fingers" 60 are fixed to one side of the mold. The mold "fingers" are comprised of a gas porous material such as a sintered metal filter or ceramic filter as shown in detail in FIG. 5. The gas porous filters have holes that are small enough to prevent the catalyzed liquid ethoxides from weeping into the gas channel. The surface tension of the ethoxides prevents the weeping. The taper 52 of the "finger" allows the mold to be withdrawn from the aerogel inorganic polymer matrix 50 without breakage. A mold release agent such as silicone is sprayed on the mold before the catalyzed ethoxides are introduced into the mold. The gas porous nature of the mold fingers allow rapid supercritical drying and replacement of the water hydrolysis product, ethanol, and organics within the inorganic polymer matrix with carbon dioxide or other supercritical gas. Once the gases have diffused through the porous filter, the hollow filter path, and holes in the stainless steel side mold plates, they are swept into the main stream of gas 74 that flows past the molds that are contained by the supercritical fluid extraction vessel 70 as illustrated in FIG. 7. The two unit operations of polymerization and supercritical drying are carried out in the aerogel mold 72. This allows the inorganic aerogel polymer matrix and glass reinforcing fibers to achieve their maximum composite strength since they are both polymerized and "cured" or dried without disturbance to the inorganic polymer matrix or the glass reinforced fibers.

Aerogel catalyst composition for the selective catalytic reduction of $NO_x$ with ammonia:

| Metal Oxide | Wt. % (elemental metal*) |
| --- | --- |
| $TiO_2$ | 70 to 90 |
| $WO_3$ | 5 to 20 |
| $V_2O_5$ | 5 to 20 |
| $ZrO_2$ | 0.5 |

* calculation basis uses only the transition metal element, oxygen is excluded.

Vanadium and tungsten are active toward selective catalytic reduction on $NO_x$ in two regions, $V_2O_5$ being more active near 400 C and $WO_3$ being more active near 500 C. $Z_rO_2$, by the nature of its size and electron structure is utilized to create dislocations in the crystalline structure of the metal oxide complex and thereby increase the reactive surface area of the transition metal oxide surface. Vanadium and tungsten have a cubic body centered crystalline structure with atomic radius of 1.92 and 2.0 Angstroms respectively. Zirconium has a hexagonal crystalline structure with an atomic radius of 2.16 Angstroms.

OPERATION/WORKING INVENTION

The aerogel honeycomb mold is first prepared spraying the entire inside surface with an appropriate mold release agent that will not interfere with the ethoxide condensation reaction such as a silicone lubricant. The mold is then assembled by sliding the ceramic tensioning caps per the illustration into the stainless edge slots in the mold. Long, thin needles are then used to thread the reinforcing fibers through the threading holes in the tensioning caps in a similar way to a tennis racquet being strung. These fibers are pre-tensioned to an appropriate amount of force to offset stress induced by the intended pressure drop service load. The pretensioned fiber holes in the mold tensioning caps are plugged in the mold to prevent ethoxide weepage before gelation is initiated.

A metal alkoxide solution is then prepared with the appropriate amount of each metal constituent and the gelation or polymerization reaction catalysed with acid and excess water per methods similar to those described in previous patent U.S. Pat. No. 5,395,805 to Droege (1995) or other literature sources such as Comprehensive Inorganic Chemistry, Reviews in Chemical Engineering, "Metal Oxide Aerogel Preparation . . . ", or Advances in Colloid and Interface Science, "Inorganic Oxide Aerogels" and poured into the mold after mixing.

After gelation or polymerization, supercritical extraction of the remaining water and ethanol from the aerogel matrix is carried out. The ultra-thin honeycomb aerogel catalyst monolith is then removed and sintered per methods similar to those described in U.S. Pat. No. 5,395,805 to Droege (1995). The sintering removes the remaining organic compounds from the aerogel honeycomb matrix and maximizes the surface area.

The ultra-thin honeycomb matrix can then be used to catalyse gas phase reactions in high gas flow applications such as combustion turbine selective catalytic reduction of $NO_x$ by ammonia and complete oxidation of carbon monoxide in flue gas. Reaction bed pressure drop can be reduced by an order of magnitude, thereby generating cost savings that quickly offset the cost the retrofit installation. This is especially valid in combustion turbine applications because combustion turbine power output and thermal efficiency is extremely sensitive to the turbine exhaust duct pressure drop.

Other applications in chemical process industries and advanced power production systems such as molten carbonate fuel cells would achieve equal operating cost savings by using this approach with transition metal oxide aerogels.

SUMMARY

The use of pre-tensioned highly directional fiber reinforcement in an ultra-thin aerogel catalyst honeycomb monolith will allow the catalytic properties of the aerogel material to be fill exploited. Highly reactive, ultra low pressure drop applications should be possible with the above invention. Practical examples of these applications include selective reduction of nitrogen oxides, and complete oxidation of carbon monoxide and hydrocarbons in gas streams by the use of mixed transition metal oxide aerogel catalyst monoliths.

I claim:

1. A method of producing a thin panel or monolith of low density material comprising:

providing a gas permeable mold containing pretensioned reinforcing fibers running perpendicular to each other and at defined intervals, wherein the tensioning of the fibers is set at a loading to approximately eliminate the anticipated tensile loading stress of the thin panel or monolith in its intended service;

providing a mixture of metal alkoxides, water and a catalyst;

spraying a mold release agent onto the mold;

pouring the mixture into the mold;

polymerizing the mixture in the mold;

subjecting the polymerized mixture to supercritical drying to obtain the low density material; and withdrawing the mold from the low density material to provide said thin panel or monolith.

2. The method of producing a thin panel or monolith of low density material of claim 1, wherein said panel or monolith has gas channels and wherein the reinforcing fibers run through the panel or monolith without entering the gas channels to permit unrestricted fluid and gas flow through the gas channels.

3. The method of producing a thin panel or monolith of low density material of claim 1, wherein said thin panel or monolith is in the form of an insulating panel, a skylight or a window.

4. The method of producing a thin panel or monolith of low density material of claim 1, wherein tensioning caps on edges of the panel or monolith allow the fibers to be tensioned before the material achieves its final solid high compressive strength form.

5. The method of producing a thin panel or monolith of low density material of claim 1 wherein said reinforcing fibers consist of a material chosen to approximate the thermal coefficient of expansion of the low density material to reduce the thermal cycling stress of the panel or monolith.

* * * * *